United States Patent [19]

MacPherson et al.

[11] 4,339,361
[45] Jul. 13, 1982

[54] PHENOL-FORMALDEHYDE RESINS EXTENDED WITH CARBOHYDRATES FOR USE IN BINDER COMPOSITIONS

[75] Inventors: Edwin J. MacPherson, Sarnia; Daniel A. Frenette, Brights Grove, both of Canada

[73] Assignee: Fiberglas Canada, Inc., Toronto, Canada

[21] Appl. No.: 173,891

[22] Filed: Jul. 28, 1980

[51] Int. Cl.³ .......................... C08L 5/00; C08F 4/44
[52] U.S. Cl. ................................. 527/303; 528/162; 528/145
[58] Field of Search .......................... 260/17.2, 17.3; 528/162, 145

[56] References Cited

U.S. PATENT DOCUMENTS

| | | | |
|---|---|---|---|
| Re. 30,375 | 8/1980 | MacPherson | 260/29.3 |
| 1,062,501 | 5/1913 | Quade | 536/1 |
| 1,593,342 | 7/1926 | Meigs | 260/17.2 |
| 1,630,365 | 5/1927 | Weber | 260/17.2 |
| 1,735,030 | 11/1929 | McIntosh | 162/182 |
| 1,797,593 | 3/1931 | Sweeney | 260/17.2 |
| 1,799,954 | 4/1931 | Cherry | 260/17.3 |
| 1,801,052 | 4/1931 | Meigs | 260/17.2 |
| 1,801,053 | 4/1931 | Meigs | 260/9 |
| 1,837,216 | 12/1931 | Hawerlander | 260/9 |
| 1,845,314 | 2/1932 | Meigs | 260/17.2 |
| 1,868,215 | 7/1932 | Meigs | 260/17.2 |
| 1,868,216 | 7/1932 | Meigs | 260/17.2 |
| 1,871,641 | 8/1932 | Weber | 260/17.2 |
| 1,877,417 | 9/1932 | Meigs | 260/17.2 |
| 1,886,353 | 11/1932 | Novotny et al. | 260/17.2 |
| 1,923,321 | 8/1933 | Meigs | 260/17.2 |
| 1,949,831 | 3/1934 | Ford | 260/17.3 |
| 1,959,433 | 5/1934 | Loetscher | 260/17.2 |
| 1,975,471 | 10/1934 | Meigs | 250/17.2 |
| 1,993,708 | 3/1935 | Meigs | 260/17.2 |
| 2,001,430 | 5/1935 | Meigs | 260/17.2 |
| 2,095,093 | 10/1937 | Fuhrmann | 260/7 |
| 2,109,466 | 2/1938 | Champer | 260/17.2 |
| 2,189,132 | 1/1940 | Champer | 260/17.2 |
| 2,205,427 | 6/1940 | Loos | 528/162 |
| 2,281,584 | 5/1942 | Julian et al. | 260/17.2 |
| 2,362,086 | 11/1944 | Myers et al. | 521/39 |
| 2,362,086 | 11/1944 | Myers | 521/39 |
| 2,512,441 | 6/1950 | Rouzet | 260/17.2 |
| 2,555,058 | 5/1951 | Rouzet | 250/17.2 |
| 2,837,489 | 6/1958 | Alles | 260/17.2 |
| 2,868,743 | 1/1959 | Feigley | 260/17.2 |
| 2,886,541 | 5/1959 | Langlois | 260/17.2 |
| 2,967,859 | 1/1961 | Osipow | 536/22 |
| 3,004,941 | 10/1961 | Mestdagh et al. | 260/17.2 |
| 3,076,772 | 2/1963 | Christ | 260/17.2 |
| 3,336,185 | 8/1967 | Helbing | 260/17.2 |
| 3,404,198 | 10/1968 | Guyer | 260/17.2 |
| 3,661,814 | 5/1972 | Smith | 260/17.2 |
| 3,865,616 | 2/1975 | Akerblom | 260/17.3 |
| 4,014,726 | 3/1977 | Fargo | 156/167 |
| 4,048,126 | 9/1977 | Gibbons | 260/17.2 |
| 4,048,127 | 9/1977 | Gibbons | 260/17.2 |
| 4,085,075 | 4/1978 | Gibbons | 260/17.2 |
| 4,085,076 | 4/1978 | Gibbons et al. | 260/17.2 |

FOREIGN PATENT DOCUMENTS 519492 12/1955 Canada.
577979 6/1959 Canada.
699028 12/1964 Canada.
981389 1/1976 Canada.

*Primary Examiner*—John Kight
*Assistant Examiner*—Nathan M. Nutter
*Attorney, Agent, or Firm*—Cushman, Darby & Cushman

[57] ABSTRACT

A water-dilutable thermo-setting resol is prepared from phenol, formaldehyde, an amide and a sugar type compound. The invention provides advance in the art by allowing replacement of some of the phenol-formaldehyde resin contained in the resol with sugar type compounds.

22 Claims, No Drawings

PHENOL-FORMALDEHYDE RESINS EXTENDED WITH CARBOHYDRATES FOR USE IN BINDER COMPOSITIONS

This invention relates to resins suitable for use in binder systems for bonding mineral fibre products. The resins are water-dilutable, thermo-setting phenol-formaldehyde resins of the resol type which are prepared from phenol, formaldehyde, an amide type compound and mono- or oligosaccharides, or water-soluble polysaccharides.

BACKGROUND OF THE INVENTION

A great deal of prior work has been done on the phenol-formaldehyde resin system. These resins are valuable for use in preparing various thermo-setting binder materials. Phenol-formaldehyde resins constitute a principal binding agent for mineral fibres, such as glass fibres, imparting integrity of shape and physical properties to the finished product. In the majority of cases they are applied in aqueous solution.

In the manufacture of mineral fibre insulation products, phenol-formaldehyde resins in binder material are usually applied either in an unpolymerized, or initially polymerized or intermediate stage of polymerization. The binder material is subsequently sprayed onto the fibres to form a fibre-resin pack. The pack is advanced to a cured stage upon activation by heat and/or catalysts with or without the application of pressure for densification of the composite mass into a board or molded form of the desired configuration. Typically, the thermo-setting resins are phenol-formaldehyde condensation products of the resol type, such as described in Canadian Pat. No. 1,080,871 and U.S. Pat. No. 3,932,334 (reissued as U.S. Pat. No. Re. 30,375) of the same assignee, the disclosures of which are hereby incorporated by reference.

Binder systems for binding mineral fibre products usually contain, in conjunction with the phenolic resins and water substances such as modifiers, e.g. extenders, coupling agents, dyes, processing oils, ammonia, and, occassionally, other additives. Binders of this type are disclosed in Canadian Pat. No. 1,001,788 of the same assignee, the disclosure of which is hereby incorporated by reference.

It is customary in preparing prior art glass fibre resin-impregnated insulation materials to minimize the amount of resinous binder which is employed to thereby secure economic savings. However, the use of low amounts of binder results in reduced mechanical properties, whereas in general the use of higher amounts of binder results in better mechanical properties. Frequently, amide type compounds, such as urea, dicyandiamide or melamine, or water-miscible condensation products of these amide type compounds with formaldehyde are used as modifiers or extenders.

These additives may reduce the release of volatile phenolic reaction products during application and cure of phenol-formaldehyde resins and thus reduce pollution of the air. Furthermore, it is desirable from an economic viewpoint, to find ways of reducing the costs associated with phenol-formaldehyde resins used in the manufacture of glass fibre insulation products.

The phenol-formaldehyde resins which are useful for glass fibre insulation manufacture, are most often extended with urea. The urea modifies the properties of these resins in a desirable manner and contributes to the overall efficiency and usefulness of the binder system. Over a number of years these resins and binder systems have been optimized to provide the best level of useful properties, processability and cost.

Materials which might be used to further extend these binders must be compatible with these existing binder systems, must not detract from the established properties of either the binder or product manufactured from these binders, and, of course, must also be cost effective. In addition, a potential extender must not produce a disruptive effect on the balance of the manufacturing processes which have been established and are operating.

Attempts to extend binder systems for mineral fibre products using a variety of additives and co-reactants have been made and described. The most common approach has been to add lignin compounds. These materials, indeed, extend the binders, but also shorten the gel times excessively, making it difficult to run lignin extended binders in the manufacture of many types of heavy density glass fibre products.

U.S. Pat. No. 3,336,105 to Helbing discloses the use of ammonium lignosulfonate as extender applied in conjunction with urea.

U.S. Pat. No. 4,014,726 to Fargo describes the use of starch and starch degradation products as replacement for dicyandiamide extender applied in conjunction with urea extender.

It is an object of the invention to extend phenol-formaldehyde resins, which are suitable for use in binder systems for bonding mineral fibre products, with inexpensive and effective extenders.

It is a further object of the invention to reduce the percentage of phenol required in binder systems based on phenol-formaldehyde resins by extending the resin with an amide or amine such as urea and a sugar.

It is a further object of the invention to increase the amount of amide or amine such as urea which can be used to extend a phenol-formaldehyde resin by adding to the resin mono- or oligosaccharides, or water-soluble polysaccharides.

DETAILED DESCRIPTION OF THE INVENTION

In one aspect of the invention there is provided a method of preparing a water-dilutable, thermo-setting, low phenol-containing resol. The method comprises reacting phenol and formaldehyde to yield a phenol-formaldehyde product and reacting said product with an amide as an extender to form a phenol-formaldehyde-"amide" resin, which contains the maximum amount of amide permissible under given process conditions. The improvement in the method consists of adding a sugar to phenol and formaldehyde, or to phenol-formaldehyde resin, or to phenol-formaldehyde-"amide" resin in an aqueous basic medium to yield a resol. The phenol to formaldehyde molar ratio of the resol is between 1:2.3 and 1:5, preferably of between 1:2.8 and 1:4.5, more preferably of between 1:3.2 and 1:4.4, and most preferably of between 1:3.6 and 1:3.8. The phenol-formaldehyde to amide ratio of the resol is between 70:30 and 40:60 parts by weight, preferably of between 60:40 and 45:55 parts by weight; and the phenol-formaldehyde to amide plus sugar ratio of the resol can be up to 35:65 parts by weight, preferably, however, the ratio of phenol-formaldehyde resin to total extender is up to 38:62, more preferably up to 40:60, and most preferably the ratio is 42:58 and 45:55 parts by weight. The amide compound is chosen from the group consisting of urea, dicyandiamide, melamine and mixtures thereof. The preferred amide is urea. Preferably, the amide compound is present in an amount greater than the maximum amount permissible in the absence of a sugar compound. The sugar is chosen from the group consisting of mono- and oligosaccharides and water-soluble polysaccharides.

The sequence in which the reactants are added can be as follows:

(a) phenol is reacted with formaldehyde and to the resulting resin amide and sugar components are added;

(b) phenol is reacted with formaldehyde in the presence of sugar and amide components are added subsequently; or (c) phenol is reacted with formaldehyde, the resulting resin is reacted with the amide component and sugar is added thereafter.

In a second aspect there is provided a water-dilutable, thermo-setting, low phenol-containing resol comprising a condensation product of phenol, formaldehyde, an amide compound chosen from the group consisting of urea, dicyandiamide, melamine, and mixtures thereof, the preferred amide being urea, and a sugar compound chosen from the group consisting of mono- and oligosaccharides and water-soluble polysaccharides. The molar ratio of phenol to formaldehyde in the resol is between 1:2.3 and 1:5, the ratio in parts by weight of phenol-formaldehyde to amide or amine is between 70:30 and 40:60, and the amount of sugar plus amide extender added is up to a ratio of phenol-formaldehyde to total extender of 35:65 parts by weight. The amount of amide contained in the resol is at least the maximum amount permissible under given process conditions, preferably, the amount of amide contained in the resol is greater than the maximum amount permissible in the absence of sugar.

In the practice of manufacturing fibre glass insulation products according to the invention, it is necessary to utilize binder systems containing water-dilutable resins such as water-soluble or water-dispersible resin systems which are applied to the glass fibre as it is formed. The point of application of the resin to the glass is a jet stream of hot gases consisting of air and combustion products of gas or oil fired burners. This high velocity, high temperature jet stream flash evaporates the water used to carry the resin and the resin itself is then deposited onto the glass fibre. This flash evaporation process can cause low molecular weight steam volatile products in the resin to be carried over in the steam phase, resulting in an environmental pollution problem. In order to remove the more obnoxious by-products, such as unreacted phenol, from the resin, a phenol to formaldehyde molar ratio of between 1:2.8 and 1:5 is used. This excess formaldehyde serves to ensure that all the monomeric phenol is utilized and thus reduces the chance of unreacted phenol or volatile low substitution methylol phenols being vented to the atmosphere. Such high mole ratio of formaldehyde to phenol in the resins also appears to increase the resinification efficiency and permits subsequent combination with low cost monomers.

Phenol-formaldehyde resins which have been found to be particularly useful in the manufacture of binders for bonding of glass fibre insulation products are based on alkali catalyzed condensation of phenol with formaldehyde such as described in the above-mentioned Canadian Pat. No. 1,080,871.

In the course of manufacturing such resins unreacted formaldehyde remains in the resin solution. This formaldehyde is effectively utilized by adding to the resin materials which are formaldehyde "scavengers" and resol coreactants. Suitable are nitrogen-containing organic compounds which are soluble in the phenol-formaldehyde mixture and contain at least two —NH groups per molecule. Hereinafter such compounds are called "amide" Particularly suitable are any di- or polyfunctional amide such as urea, dicyandiamide, or melamine. The most often used compound is urea, which is known to react with the formaldehyde to yield predominantly methylol ureas. From a chemical point of view, one would anticipate that only sufficient amide type compound should be added to completely react on a molar basis with the free formaldehyde present. In practice, it is found that higher levels of amide are required to enable the process to run in an optimal fashion. Presumably, the flash evaporation process and subsequent heat curing of the resin liberates additional formaldehyde from the resin as it begins to cross-link and thermoset. The liberated formaldehyde is probably, to some extent, free to react with the excess amide.

In the course of optimizing the utilization and properties of the phenol-formaldehyde resins with high formaldehyde content, such as resins having a molar ratio of phenol to formaldehyde of 1:3.7, it may be optimal, depending on the particular process to add approximately 45 parts by weight of urea solids to 55 parts by weight of phenol-formaldehyde resin solids. Less urea may be utilized. However, at lower urea levels, it becomes not only more difficult to run the manufacturing process in a clean and orderly fashion, but the resin becomes less economical, since the urea extender is usually less costly than the resin.

Attempts have also been made to utilize additional urea in the process, as it is economically advantageous to use less phenol-formaldehyde resin. However, it has been found that at urea extension levels much beyond the ratio of about 55 parts of phenol-formaldehyde resin to 45 parts of urea the desirable properties of the binder systems are compromised. Thus, at levels of 50 parts of phenol-formaldehyde resin to 50 parts of urea, the gel time of the mixture becomes exessively long and the material becomes difficult to cure, process losses become greater, and the tensile strength properties of the binder begin to decrease.

In the course of searching for alternative materials suitable as extenders for phenol-formaldehyde resins which are useful in mineral fibre binders, the present inventors unexpectedly found that sugar type compounds can be added in various proportions to phenol-formaldehyde resins which already contain the optimal amount of amide or amine type extenders. The resulting resins exhibit exceptionally good wet and dry tensile strength properties with minimal change to the gel time and minimal curing losses. Sugars which are useful as extenders include aldose and ketose monosaccharides such as glucose or fructose; disaccharides such as sucrose, lactose, maltose and raw sugar; mixtures of mono-, di- or higher oligo-saccharides such as corn syrup and molasses; and water-soluble polysaccharides such as dextrin.

It was especially surprising that binder systems extended with such sugars exhibited good wet tensile strength, since it was generally felt by those knowledgable in the art, that sugars affect the wet tensile strength of these binders in insulation products. For that reason, the lignins, which are currently used as extenders in the industry, are often purified to remove the wood sugars present.

In the course of defining the new limits to which phenol-formaldehyde resin binders could be extended with the sugars, it was found that in the presence of a sugar extender the amount of urea which can be added to a phenol-formaldehyde resin can be increased without undue undesirable effects on properties, such as tensile strength, of the resin system.

There seems to be a synergistic effect under which the presence of the sugar extender allows an increase of the urea level up to 55 parts by weight to 45 parts by weight of phenol-formaldehyde resin. A resin which with urea alone could advantageously only be extended to an optimum of 45 parts by weight of urea, can in the presence of sugar be extended up to 55 parts by weight of urea to 45 parts by weight of phenol-formaldehyde resin. The maximum amount of extender which can be added according to the invention is 65 parts by weight of sugar plus urea to 35 parts by weight of phenol-formaldehyde resin. Thus, the addition of a sugar extender allows a reduction in phenol-formaldehyde resin of from 55 parts by weight to 35 parts by weight of the final extended resin. In this way up to about 35 percent less phenol-formaldehyde resin is necessary to yield resins for use in binders which have satisfactory physical properties.

According to the invention sugar extenders can be added in several different ways. They can be added to phenol and formaldehyde (a) at the beginning of the condensation reaction or (b) during the condensation reaction. The products resulting from (a) or (b) are then reacted with the amide or amine extender. Alternatively, the sugar extender can be added to the phenol-formaldehyde resin either (c) simultaneously with the amide extender or (d) after the reaction of the amide extender with the phenol-formaldehyde resin has taken place and a phenol-formaldehyde-"amide" resin has been formed.

It was found that the extended resins resulting from procedures (a) to (d) exhibit only minor differences in gel times and tensile strengths. It follows that the sugar extenders can, in effect, be added at any time during the reaction cycle used to prepare the phenol-formaldehyde resin or at some point after preparation of these resins and still produce a desirable and beneficial effect in the overall properties of the resulting extended resins, and consequently, of the binders.

In order to test whether the sugar type extenders react with either phenol or formaldehyde or urea the following tests were carried out:

(a) Phenol and cornsyrup were refluxed with lime and water for 2 days. The free phenol content dropped only from 23% to 19% in 2 days. In a second test phenol and glucose were heated with sodium hydroxide as catalyst. Analysis of samples withdrawn periodically showed no significant reduction in the amount of free phenol.

(b) Formaldehyde was stirred overnight with either a glucose solution or water. The solutions were adjusted to pH 9.1 with sodium hydroxide. No significant difference in the drop of the free formaldehyde content was recorded.

(c) A urea solution was stirred overnight at room temperature with either a glucose solution or water. Both solutions were adjusted to pH 9.1 with sodium hydroxide. No significant difference in the resulting urea levels was recorded.

It appears, therefore, likely that the sugar extender takes no part in the reactions between phenol, formaldehyde and the amide extender until the final binder composition is cured.

The phenol-formaldehyde reaction, according to the invention, is carried out in an aqueous basic medium. Types of basic catalysts suitable include alkali metal and alkaline earth metal hydroxides or oxides and tertiary amines. Thus, sodium, potassium and lithium hydroxides are suitable, as are calcium, barium, magnesium and strontium oxides and hydroxides. Triethylamine, tripropylamine, tributylamine, 1,4-diazobicylo (2,2,2) octane and mixtures thereof and other known amines are suitable. In general, these materials must be basic (p $K_b \leq 5$) and soluble in the phenol-formaldehyde mixture and produce a pH $\geq 7$ and preferably a pH of between 7.5 and 9.5. Among the alkaline catalysts generally used calcium compounds are most preferred, as calcium salts are less soluble in water than sodium or potassium salts and, thus, render the resulting resin and binder less susceptible to leaching.

In determining whether an additive has utility as an extender in the phenol-formaldehyde resin system several tests are carried out according to standardized test methods.

The effect of the additive on the dry and, more specifically, the wet tensile strength is tested in the following way. The phenolic resin is combined with urea, ammonium sulphate and silicone along with microbeads. The mixture is formed in dogbones, (test bars which are thicker at the ends) and cured. One half of the dogbones are broken dry using a Scott tester and the other half are subjected to saturated steam under pressure, then tested. The percent retention is calculated in the following way:

$$\% \text{ Retention} = \frac{\text{average wet tensile strength}}{\text{average dry tensile strength}} \times 100.$$

Resin systems which show good tensile strength and good retention of tensile strength on autoclaving are considered to be durable. Typically, a wet tensile strength of 400 psi is considered to be the lower limit which will give the finished insulation product an adequate durability on ageing. Surprisingly, the samples which are treated with glucose extender exhibit exceptionally good wet tensile strengths.

The gel time of a resin gives an indication of its curing time and provides insight into the processability of a particular resin.

A brass cup is provided with a heating device suitable for maintaining a constant temperature of 130° C.±1° C. The sample is placed in the cup and stirred with a glass stirring rod. As the end-point approaches, test pulls may be made by lifting the rod approximately 2 in. out of the sample with quick pulls. The end-point is reached when the pulled thread breaks and "snaps back", showing elasticity. The time is noted and recorded in seconds. Gel times of 1000 and 1300 seconds are desirable. Gel times much in excess of 1300 seconds may result in curing difficulties, while gel times much less than 1000 seconds may result in precure problems. Under certain conditions gel times as low as 800–900 seconds may be operable. Addition of sugar extenders decreases slightly the gel time of phenol-formaldehyde-"amide" resins, thereby indicating some reactivity between the sugar and the phenol-formaldehyde-"amide" resin.

The percent solids are indicative of the losses which might be expected on curing under static conditions. Resin solids are determined as follows:

a. Total Solids

Not less than 2 grams of the resin are placed into a weighed ointment tin and weighed to 0.001 gram accuracy. To each of the two samples add 10 ml methyl alcohol and place tins and content in a cluster around the thermometer in a gravity type constant temperature oven, without lids. Dehydrate the samples for exactly two (2) hours at 300° F.±5°. Replace the lids as soon as possible after opening oven door, cool samples in a dessicator to room temperature and weigh. Calculate total solids: Final Weight/Original weight×100=Total Solids. Accept 0.5% difference between duplicate samples and report as the average of the two.

b. Ash Content 10.0±0.1 grams of resin are weighed into a weighed platinum (2.5 in. diameter) evaporating dish with cover, hydrated in an oven at 300° F. for one hour, with lid partly open and transferred into a controlled temperature muffle furnace at 1000° F. for Na or Ba resins or 1600° F. for Ca resin, ±50° F. The dish is allowed to remain in the furnace overnight, removed, cooled in a dessicator and the residue weighed. The ash content is reported as percent $Na_2O$ Ba O or Ca O.

c. Organic (Resin) solids: Total Solids−ash=organic solids.

Furthermore, the percent loss on ignition are determined as weight percent of the wool product. A weighed sample of the material is placed in a muffle oven at 950° F.±25° F. When the organic material has ignited and the sample is uniform in colour throughout, it is cooled to room temperature and weighed and the ignition loss is calculated.

EXAMPLE 1

Preparation of a calcium catalyzed phenol-formaldehyde resin having a molar ratio of phenol to formaldehyde of 1:3.7

Production of calcium catalyzed phenol-formaldehyde resin of the starting ratio 1 mol phenol to 3.7 mol formaldehyde (P/F 1:3.7).

Batch size: 3000 gals.
Ingredients:

| | |
|---|---|
| Formaldehyde - aqueous 44% solution | 2235 gals. |
| phenol - U.S.P. 98% | 912 gals. |
| Ca(OH)$_2$ - Beachville Chemical High Calcium Hydroxide Powder taken as 99% pure | 880 lbs. |

Procedure:

The 3,000 gals. reactor was loaded with formaldehyde and phenol. The agitator was started. The catalyst (Ca(OH)$_2$) was poured in over a period of about one hour and 34 minutes.

The temperature at this point was about 86° F. It was held at 86° F. for about 25 minutes, then the temperature was raised to 110° F. in 32 minutes. The temperature was held at 110° F. for about 28 minutes. The temperature was increased to 125° F. in 20 minutes. The temperature was held at 125° F. for about 40 minutes. The temperature was increased to 150° F. in 50 minutes. The temperature was held at 150° F. for about 55 minutes to a free formaldehyde of 8.20%. The mixture was cooled to 80° F. The final pH was 8.55.

Result:
Free phenol 0.3%
The resin was neutralized with carbon dioxide to a pH of 7.8.
Organic solids: 44.5%
Gel time at 266° F.: 512 seconds

EXAMPLE 2

Binder preparation 126 grams of phenolic resin resulting from Example 1 (1:3.7 charge ratio—44.5% organic solids)was adjusted to a pH of 8.2 using carbon dioxide, which was dispersed by using a porous sparger and an efficient agitator. Then 46 gram of urea were added. This was mixed well until the urea was fully dissolved. The following were added to the mixture: 1 gram of ammonium hydroxide, 1 gram of a 10% silane solution, and 20 grams of a 50% oil emulsion. The mixture was diluted further down to 20% organic solid by adding 350 grams of water.

EXAMPLE 3

Preparation of a phenol-formaldehyde resin with a ratio of phenol to formaldehyde of 1:3.7

In a 2 liter flask equipped with a stirrer and a stainless steel heat exchange coil 500 g phenol (5.3 mol, 98%) were added to 1340 g formaldehyde (19.6 mol, 44%) to yield a starting ratio of 1 mol phenol to 3.7 mol formaldehyde. Over a period of 5 minutes 57 g triethylamine (0.56 mole) were added. The pH was 8.9. The temperature was held at 44° C. for two hours. The temperature was then raised to 71° C. until the free formaldehyde content had dropped to 11.2%. The resulting resin was fully dilutable to over 2000% and had a free phenol content of 0.7%. The resin was divided in two batches. The pH of the one batch was adjusted to 8.2 with 20% sulfuric acid. To each batch a 50% solution of urea was added and the mixtures were stirred overnight. Gel time and wet and dry tensile strengths of both resulting resins were measured.

TABLE I

| | | Tensile Strengths | |
|---|---|---|---|
| Resin reacted at | Gel Time (sec) | Wet (psi) | Dry (psi) |
| pH 8.9 | 1150 | 670 | 1116 |
| pH 8.2 | 1370 | 537 | 820 |

EXAMPLE 4

Preparation of phenol-formaldehyde resins with various molar ratios of phenol to formaldehyde (a) Phenol to formaldehyde ratio of 1:3.3 (P/F 1:3.3)

In a 4 liter flask equipped with a stirrer and an internal heat exchange coil 768 g phenol (8.0 mol, 98%) were added to 1800 g formaldehyde (26.4 mol, 44%). Calcium oxide was added over a 15 minute period. The temperature was raised to 85° F. It was held at 85° F. for two hours then raised to 110° F. and held for one hour, then further raised to 125° F. and held for one hour, and, finally raised to 150° F. and held until the desired final amounts of free formaldehyde and free phenol were reached.

In the case of the P/F 1:3.3 resin the free formaldehyde amounted to 8.4% and the free phenol to 0.08%, the dilutability was 1000%, the organic solids 45.0% and the pH 8.5.

(b) P/F 1:3.6.

To 768 g phenol (8.0 mol, 98%) were added 1964 g formaldehyde (28.8 mol, 44%). As catalyst 52.7 g calcium oxide were added. The reaction was carried out as in (a). The resulting resin had a free formaldehyde content of 9.0%, a free phenol content of 0.05%, a dilutability of over 2000%, an organic solids content of 43.9% and a pH of 8.7.

(c) P/F 1:2.8

To 864 g phenol (9.0 mol, 98%) were added 1718 g formaldehyde (25.2 mol, 44%), and 41.5 g calcium oxide. The reaction was carried out as in (a). The resulting resin had a free formaldehyde content of 4.8%, a free phenol content of 1.4%, a dilutability of over 2000%, an organic solids content of 48.9% and a pH of 8.0.

(d) P/F 1:4.0

To a P/F 1:3.6 resin additional formaldehyde was added to arrive at a ratio of 1:4.0. The resulting resin had a free formaldehyde content of 10.0% and an organic solids content of 43.2%.

(e) P/F 1:4.4

To a P/F 1:3.6 resin additional formaldehyde was added to arrive at a ratio of 1:4.4. The resulting resin had a free formaldehyde content of 12.4% and an organic solids content of 40.9%.

EXAMPLE 5

Addition of a sugar type compound at various stages of the reaction of phenol with formaldehyde (a) To 576 g phenol (6 mol, 98%) were added 1456 g formaldehyde (21.6 mol, 44%) and 662 g corn syrup (50%). As catalyst 39.5 g calcium oxide was added. The reaction was carried out as in Example 4(a). The resulting resin had a free formaldehyde content of 6.2%, a free phenol content of 0.21%, a dilutability of over 2000%, an organic solids content of 43.0% and a pH of 8.6.

(b) To 576 g phenol (6 mol, 98%) were added 1456 g formaldehyde (21.6 mol, 44) and 39.5 g calcium oxide. The reaction was carried out as in Example 4(a). Before raising the temperature of the reaction medium to 150° F., 662 g corn syrup (50%) were added. Thereafter the reaction was continued as usual. The resulting resin had a free phenol content of 0.15%, a dilutability of over 2000%, an organic solids content of 43.0% and a pH of 8.7.

EXAMPLE 6

Effect of different glucose levels on a phenol-formaldehyde (P/F) 1:3.7 resin

Samples of a calcium catalyzed phenol-formaldehyde (P/F) resin having a molar ratio of phenol to formaldehyde of 1:3.7 were treated with urea to give resin-urea solids blends (R/U) of 55/45, 50/50, 45/45 and 40/60 parts by weight. These mixtures were then treated with various amounts of 43° Baumé glucose derived from corn syrup to give a resin-urea-glucose (R/U/G) mixture. Gel times, tensile strengths and percent solids were determined on the samples. The results are tabulated in Table II. From the data in Table II it can be seen that as the level of glucose is increased, the gel time surprisingly decreases, perhaps indicating reactivity between the glucose and the R/U resin. As the glucose level continues to increase, however, the tensile strengths decrease. With a wet tensile strength of about 400 psi the 55/45/40 R/U/G systems would be adequate for glass bonding purposes. The 50/50 R/U resin exhibits an excessively long gel time indicating that such a system would be most difficult to cure in the manufacturing process. By adding glucose, however, reasonable tensile strength properties can be maintained and the gel time can be decreased to the 1,250 to 1,300 second range which is curable. In the 45/55 R/U resin the strengths are adequate, but the gel time is getting excessively long making such a mixture very difficult to process. Surprisingly, even at this very high extension level, glucose still has a positive effect on the gel time. For example, the 45/55/30 R/U/G resin with a gel time in the 1,250 second region is similar to non-extended 55/45 R/U resin.

TABLE II

The Effect of Different Glucose Levels on a P/F 1:3.7 Resin Extended with Varying Urea Levels

| R/U or R/U/G Blend | % Organic Solids | Gel Time (sec.) | Tensile Strengths | | | Loss on Ignition % |
|---|---|---|---|---|---|---|
| | | | Dry (psi) | Wet (psi) | % Retention | |
| 70/30 R/U | 45.73 | 783 | 936 | 1024 | 109.4 | 3.54 |
| 60/40 R/U | 44.13 | 1220 | 1092 | 600 | 55.0 | 3.55 |
| 55/45 R/U | 43.96 | 1250 | 1043 | 564 | 54.1 | 3.53 |
| 55/45 R/U | 43.30 | 1215 | 824 | 598 | 72.6 | |
| 55/45/10 R/U/G+ | 44.68* | 1217 | 755 | 608 | 80.5 | 3.65 |
| 55/45/20 R/U/G | 46.03* | 1245 | 557 | 604 | 108.4 | 3.48 |
| 55/45/30 R/U/G | 47.62* | 1135 | 440 | 536 | 121.8 | 3.72 |
| 55/45/40 R/U/G | 48.65* | 1055 | 446 | 393 | 88.1 | 3.46 |
| 50/50 R/U | 43.66 | 1390 | 888 | 611 | 68.8 | 3.34 |
| 50/50 R/U° | 43.66 | 1390 | 880 | 713 | 81.0 | 3.34 |
| 50/50/10 R/U/G | 44.59* | 1355 | 636 | 431 | 67.8 | 3.41 |
| 50/50/20 R/U/G | 45.66* | 1305 | 422 | 404 | 95.7 | 3.61 |
| 50/50/30 R/U/G | 46.86* | 1295 | 457 | 422 | 92.3 | 3.55 |
| 45/55 R/U | 43.24 | 1510 | 467 | 476 | 101.9 | 3.45 |
| 45/55/10 R/U/G | 44.29* | 1405 | 462 | 510 | 110.4 | 3.24 |
| 45/55/30 R/U/G | — | 1250 | — | — | — | — |
| 40/60 R/U | 42.92* | 1965 | 398 | 380 | 95.5 | 3.20 |

°This sample received an extra half hour cure at 200° C.
*Denotes use of 80% glucose solution - all others used 50% glucose solution
+By convention, we consider a 55/45/10 mixture to be 10% extension with glucose for simplicity. The actual percentage is 50/40.91/9.09, R/U/G.

EXAMPLE 7

Effect of different molar ratios of phenol to formaldehyde on the addition of extenders Calcium catalyzed phenolic resins with P/F molar ratios of 1:2.88, 1:3.3, 1:3.6, 1:4.0 and 1:4.4 were prepared analogous to the procedure in Example 4. These resins were subsequently treated with urea and glucose. The results are shown in Tables III, IV, V and VI.

The results in Tables III, IV, V and VI show that glucose can be used to extend these different mole ratio resins without any particular detrimental effects to the overall properties. For all of the resins tested the results seem to indicate a shortening of the gel time as the glucose levels are increased.

TABLE III

The Effect of Glucose on a P/F 1:2.8 Resin Extended with Urea

| R/U or R/U/G Blend | % Organic Solids | Gel Time (sec.) | Tensile Strengths Dry (psi) | Tensile Strengths Wet (psi) | % Retention | Loss on Ignition % |
|---|---|---|---|---|---|---|
| 70/30 R/U | 45.76 | 755 | 1216 | 975 | 80.2 | 3.68 |
| 70/30/10 R/U/G | 44.57 | 685 | 1048 | 888 | 84.7 | 3.56 |
| 60/40 R/U | 44.46 | 900 | 909 | 666 | 73.3 | 3.72 |
| 60/40/10 R/U/G | 43.36 | 895 | 948 | 665 | 70.2 | 3.58 |

TABLE IV

The Effect of Glucose on a P/F 1:3.3 Resin Extended with Urea

| R/U or R/U/G Blend | % Organic Solids | Gel Time (sec.) | Tensile Strengths Dry (psi) | Tensile Strengths Wet (psi) | % Retention | Loss on Ignition % |
|---|---|---|---|---|---|---|
| 65/35 R/U | 44.53 | 950 | 1245 | 764 | 61.4 | 3.74 |
| 65/35/10 R/U/G | 43.51 | 850 | 1023 | 749 | 73.2 | 3.50 |
| 55/45 R/U | 43.42 | 1160 | 997 | 676 | 67.8 | 3.51 |
| 55/45/10 R/U/G | 42.38 | 1115 | 859 | 604 | 70.3 | 3.61 |

TABLE V

The Effect of Glucose on a P/F 1:4.4 Resin extended with Urea

| R/U or R/U/G Blend | % Organic Solids | Gel Time (sec.) | Tensile Strengths Dry (psi) | Tensile Strengths Wet (psi) | % Retention | Loss on Ignition % |
|---|---|---|---|---|---|---|
| 55/45 R/U | 42.63 | 1280 | 955 | 672 | 70.4 | 3.56 |
| 55/45/20 R/U/G | 41.66 | 1225 | 813 | 794 | 91.7 | 3.52 |
| 50/50 R/U | 42.16 | 1460 | 744 | 580 | 77.9 | 3.66 |
| 50/50/20 R/U/G | 40.66 | 1410 | 554 | 565 | 102.0 | 3.42 |
| 45/55 R/U | 42.42 | 1620 | 701 | 564 | 80.6 | 3.47 |
| 45/55/20 R/U/G | 40.73 | 1625 | 507 | 545 | 107.5 | 3.41 |
| 40/60 R/U | 42.43 | 1805 | 512 | 540 | 105.3 | 3.35 |

TABLE VI

The Effect of Glucose on a P/F 1:4.0 Resin Extended with Urea

| R/U or R/U/G Blend | % Organic Solids | Gel Time (sec.) | Tensile Strengths Dry (psi) | Tensile Strengths Wet (psi) | % Retention | Loss on Ignition % |
|---|---|---|---|---|---|---|
| 55/45 R/U | 42.93 | 1320 | 838 | 669 | 79.8 | 3.18 |
| 55/45/20 R/U/G | 41.89 | 1315 | 709 | 777 | 109.6 | 3.26 |
| 50/50 R/U | 42.80 | 1400 | 841 | 668 | 79.5 | 3.41 |
| 50/50/20 R/U/G | 41.50 | 1360 | 581 | 664 | 114.5 | 3.54 |
| 45/55 R/U | 42.73 | 1645 | 554 | 593 | 107.0 | 3.22 |
| 45/55/20 R/U/G | 41.16 | 1400 | 409 | 519 | 126.9 | 3.27 |
| 40/60 R/U | 42.22 | 1905 | 401 | 460 | 114.5 | 3.49 |

EXAMPLE 8

Addition of sugar at various points in the resin formation

A P/F 1:3.6 resin was prepared and during the preparation glucose was added either at the beginning of the phenol-formaldehyde condensation reaction or part way through the reaction cycle as described in Example 5. In another experiment the samples of finished P/F 1:3.6 resin were allowed to react with urea and then with glucose or with urea and glucose at the same time. The results are shown in Table VII. Some minor differences in gel times and tensile strengths were noted, but the glucose, in effect, can be added at any time in the reaction cycle used to prepare the resins or at some point after their preparation and still produce the desirable effect.

TABLE VII

The Effect of Adding Glucose During the Preparation of a P/F 1:3.6 Resin And Extension with Urea

| Materials | % Organic Solids | Gel Time (sec.) | Tensile Strengths Dry (psi) | Tensile Strengths Wet (psi) | % Retention | Loss on Ignition % |
|---|---|---|---|---|---|---|
| 55/45/20 R/U/G | | | | | | |
| R + U + G[1] | 41.51 | 1255 | 776 | 612 | 78.9 | 3.54 |
| (R + G)[2] + U | 41.68 | 1135 | 772 | 632 | 81.9 | 3.48 |
| (R + G)[3] + U | 41.75 | 1195 | 695 | 688 | 99.1 | 3.65 |
| (R + U)[4] + G | 41.69 | 1280 | 703 | 847 | 120.5 | 3.69 |
| 50/50/20 R/U/G | | | | | | |
| (R + G)[2] + U | 41.39 | 1240 | 646 | 690 | 106.8 | 3.42 |
| (R + G)[3] + U | 41.40 | 1285 | 607 | 644 | 106.1 | 3.50 |
| (R + U + G)[1] | 41.31 | 1230 | 586 | 563 | 96.1 | 3.26 |

[1]The resin, urea and glucose were added together at the same time and allowed to mix overnight.
[2]The glucose was added at the start of the P/F 1:3.6 resin preparation and prior to the addition of the catalyst.
[3]The glucose was added prior to the 150° F. cycle of the P/F 1:3.6 resin preparation.
[4]The resin and urea were allowed to react overnight and then the glucose was added just prior to preparing the tensile specimens.

EXAMPLE 9

Sugar type compounds suitable as extenders

To a P/F 1:3.7 resin extended with urea various sugar type compounds were added. The results are shown in Table VIII. By-product materials which contain significant quantities of carbohydrates such as molasses were found useful as extenders. Dextrin, a partially hydrolyzed starch, gave also good results whereas starch itself is not useful in this invention. Cellulosic breakdown products which contain lower molecular weight carbohydrate moieties are suitable.

TABLE VIII

The Effect of Different Carbohydrates on a P/F 1:3.7 Resin Extended with Urea

Tensile Strengths Loss

TABLE IX

EFFECT OF CARBOHYDRATES AND OTHER ADDITIVES ON VARIOUS RESIN[1]/UREA MIXES

| Item # | Description | [2]Tensile Strength (psi) Dry | Wet | % Retention | [3]Gel Time (sec.) | [4]% Solids |
|---|---|---|---|---|---|---|
| 1. | 54/46 R/U + 20% Sucrose | 855 | 493 | 57.7 | 1060 | 43.63 |
| 2. | 54/46 R/U + 20% Fructose | 853 | 610 | 71.5 | 1027 | 40.46 |
| 3. | 54/46 R/U + 20% Furfuryl Alcohol | 746 | 505 | 67.7 | 1110 | 39.20 |
| 4. | 54/46 R/U + 20% Glucose | 750 | 541 | 72.1 | 1091 | 41.22 |
| 5. | 54/46 R/U + 20% Molasses | 780 | 524 | 67.2 | 950 | 43.97 |
| 6. | 54/46 R/U + 20% Corn Syrup | 899 | 641 | 71.3 | 1061 | 42.82 |
| 7. | 54/46 R/U + 20% Glycerol | 384 | 210 | 54.7 | 1050 | 39.60 |
| 8. | 54/46 R/U + 20% Furfural | 727 | 496 | 68.2 | 1043 | 37.85 |
| 9. | 54/46 R/U + 20% α-D Methyl Glucoside | 797 | 539 | 67.6 | 1210 | 42.64 |
| 10. | 54/46 R/U + 20% Sorbitol | 563 | 392 | 69.6 | 1005 | 40.60 |
| 11. | 61/39 R/U | 876 | 611 | 69.7 | 920 | 43.60 |
| 12. | 57/43 R/U | 939 | 600 | 63.9 | 1040 | 42.90 |
| 13. | 54/46 R/U | 819 | 589 | 71.9 | 1075 | 42.50 |
| 14. | 52/48 R/U | 881 | 644 | 73.1 | 1100 | 42.10 |
| 15. | 50/50 R/U | 898 | 713 | 79.4 | 1105 | 41.55 |
| 16. | 47/53 R/U | 844 | 635 | 75.2 | 1120 | 41.40 |
| 17. | 54/46 R/U + 20% Raw Sugar | 753 | 579 | 76.9 | 975 | 43.10 |
| 18. | 54/46 R/U + 30% Raw Sugar | 667 | 634 | 95.1 | 1015 | 43.16 |
| 19. | 54/46 R/U + 20% 1,2,5 Hexanetriol | 649 | 379 | 58.4 | 1130 | 39.70 |
| 20. | 54/46 R/U + 20% Diethanolamine | 699 | 401 | 57.4 | 1350 | 39.85 |
| 21. | 54/46 R/U + 20% Triethanolamine | 622 | 398 | 64.0 | 1140 | 39.50 |
| 22. | 54/46 R/U + 20% Lactose | 852 | 579 | 68.0 | 1105 | 41.60 |
| 23. | 54/46 R/U + 20% Hexylene Glycol | 736 | 487 | 66.2 | 1105 | 36.40 |
| 24. | 54/46 R/U + 20% Mannitol | 539 | 287 | 53.2 | 935 | 39.50 |
| 25. | 54/46 R/U + 20% Dipropylene Glycol | 626 | 514 | 82.1 | 1239 | 36.70 |
| 26. | 54/46 R/U + 20% Ethylene Glycol | 722 | 461 | 63.8 | 1217 | 36.10 |
| 27. | 54/46 R/U + 20% Polyethylene Glycol-400 | 575 | 400 | 69.6 | 1250 | 39.93 |

NOTES:
[1]Phenol/formaldehyde - (1:3.7) Calcium Catalysed Resin
[2]Dog Bone Tensile Strengths using glass beads
[3]Gel time in seconds measured @ 130° C. in a brass cup
[4]% Solids, as determined after curing @ 150° C. for 2 hours.

| R*/U/C C = Carbohydrate 55/45/20 | % Organic Solids | Gel Time (sec.) | Dry (psi) | Wet (psi) | % Retention | % on Ignition % |
|---|---|---|---|---|---|---|
| (1) 55/45 R/U | 43.30 | 1215 | 824 | 598 | 72.6 | 3.33 |
| (2) Glucose | 43.37 | 1095 | 584 | 692 | 118.5 | 3.51 |
| (3) D-Fructose | 40.95 | 1090 | 719 | 642 | 89.3 | 3.57 |
| (4) Dextose | 41.78 | 1135 | 743 | 782 | 105.3 | 3.44 |
| (5) Mannose | 42.68 | 1095 | 612 | 566 | 92.5 | 3.58 |
| (6) Galactose° | 41.93 | 1085 | 719 | 549 | 76.4 | 3.44 |
| (7) Molasses | 44.35 | 1010 | 536 | 655 | 122.2 | 3.62 |
| (8) Sucrose | 43.74 | 1195 | 596 | 786 | 131.9 | 3.35 |
| (9) Raw Sugar | 43.74 | 1140 | 582 | 660 | 113.4 | 3.36 |
| (10) D-Lactose° | 42.32 | 1095 | 648 | 545 | 84.1 | 3.81 |
| (11) Maltose° | 42.45 | 1160 | 731 | 685 | 93.7 | 3.49 |
| (12) D-Xylose | 41.76 | 1040 | 686 | 730 | 106.4 | 3.67 |
| (13) Methylα-D-Glucoside | 44.09 | 1275 | 717 | 565 | 78.8 | 3.36 |
| (14) Dextrin | 43.65 | 1085 | 690 | 631 | 91.5 | 3.41 |
| (15) Soluble Starch | 42.03 | 1170 | 534 | 223 | 41.8 | 3.25 |

*The same resin urea batch was used to prepare all samples.
°These materials yielded milky white suspensions in 50% by weight of water. The suspensions cleared up when dissolved in the resin/urea mixtures.

EXAMPLE 10

Compounds suitable as extenders

During the course of exploring which extenders are suitable for use, a P/F 1:3.7 calcium catalyzed resin extended with urea was treated with 20 percent by weight of various compounds. The physical properties of these examples were determined as shown in Table IX. It can be seen that sugar type materials such as in items 1, 2, 4, 5, 17, 18 and 22 exhibit good wet tensile strengths and gel times. In general, the materials which are polyols or alcohols in nature such as items 3, 7, 10, 19, 23, 24, 25, 26 and 27 are deficient in wet strengths or have excessively long gel times. Amino-alcohols such as items 20 and 21 also exhibit excessively long gel times.

We claim:

1. In a method of preparing a water-dilutable, thermosetting, low free phenol-containing resole, said method comprising reacting phenol and formaldehyde to yield a phenol-formaldehyde product and reacting said product with an amide as an extender to form a phenol-formaldehyde-amide resin, which contains the maximum amount of amide permissible under given process conditions, the improvement consisting of adding a sugar to a mixture of phenol and formaldehyde, or to phenol-formaldehyde resin, or to phenol-formaldehyde-amide resin in an aqueous basic medium to yield a resole having:
a phenol to formaldehyde molar ratio between 1:2.8 and 1:4.5, a phenol-formaldehyde to amide ratio of between 70:30 and 40:60 parts by weight; and a phenol-formaldehyde to amide plus sugar ratio of up to 35:65 parts by weight;
the amide compound being selected from the group consisting of urea, dicyandiamide, melamine and mixtures thereof and the sugar being selected from the group consisting of mono- and oligosaccharides and water-soluble polysaccharides.

2. In a method of preparing a water-dilutable, thermosetting, low free phenol-containing resole, said method comprising reacting a phenol and formaldehyde to yield a phenol-formaldehyde product and reacting said product with an amide as an extender to form a phenol-formaldehyde-amide resin, which contains the maximum amount of amide permissible under given process conditions, the improvement consisting of adding sugar to a mixture of phenol and formaldehyde, or to phenol-formaldehyde resin, or to phenol-formaldehyde-amide resin in an aqueous basic medium to yield a resole having a phenol to formaldehyde molar ratio of between 1:2.8 and 1:4.5; a phenol-formaldehyde to amide ratio of between 70:30 and 40:60 parts by weight; and a phenol-formaldehyde to amide plus sugar ratio of up to 35:65 parts by weight;

the amide compound being selected from the group consisting of urea, dicyandiamide, melamine and mixtures thereof and being present in an amount greater than said maximum amount permissible in the absence of the sugar;

the sugar being selected from the group consisting of mono- and oligo-saccharides and water-soluble polysaccharides.

3. A method as in claim 1 or 2 comprising reacting the phenol with formaldehyde and subsequently adding the amide and sugar components for reaction.

4. A method as in claim 1 or 2 comprising reacting the phenol and formaldehyde in the presence of a sugar and subsequently adding an amide.

5. A method as in claim 1 or 2 comprising reacting the phenol with formaldehyde to form a resin, reacting the excess formaldehyde in the resin with an amide and subsequently adding a sugar to the phenol-formaldehyde-"amine" resin.

6. In a method of preparing a water-dilutable, thermosetting, low free phenol-containing resole, said method comprising reacting phenol and formaldehyde to yield a phenol-formaldehyde product and reacting said product with urea as an extender to form a phenol-formaldehyde-urea resin, which contains the maximum amount of urea permissible under given process conditions, the improvement consisting of adding sugar to a mixture of phenol and formaldehyde, or to phenol-formaldehyde resin, or to phenol-formaldehyde-urea resin in an aqueous basic medium to yield a resole having a phenol to formaldehyde molar ratio of between 1:2.8 and 1.4.5; a phenol-formaldehyde to urea ratio of between 70:30 and 40:60 parts by weight; and a phenol-formaldehyde to urea plus sugar ratio of up to 35:65 parts by weight;

the sugar being selected from the group consisting of mono- and oligosaccharides and water-soluble polysaccharides.

7. In a method of preparing a water-dilutable, thermo-setting, low free phenol-containing resole, said method comprising reacting phenol and formaldehyde to yield a phenol-formaldehyde product and reacting said product with urea as an extender to form a phenol-formaldehyde-urea resin, which contains the maximum amount of urea permissible under given process conditions, the improvement consisting of adding a sugar to a mixture of phenol and formaldehyde, or to phenol-formaldehyde resin, or to phenol-formaldehyde-urea resin in an aqueous basic medium to yield a resole having a phenol to formaldehyde molar ratio of between 1:2.8 and 1.4.5; a phenol-formaldehyde to urea ratio of between 70:30 and 40:60 parts by weight; and a phenol-formaldehyde to urea plus sugar ratio of up to 35:65 parts by weight;

wherein urea is present in an amount greater than said maximum amount permissible in the absence of the sugar; and the sugar is selected from the group consisting of mono- and oligo- saccharides and water-soluble polysaccharides.

8. A method as in claim 6 or 7 comprising reacting the phenol with formaldehyde and subsequently adding the urea and sugar components for reaction.

9. A method as in claim 6 or 7 comprising reacting the phenol with the formaldehyde in the presence of sugar to form a resin and subsequently adding urea.

10. A method as in claim 6 or 7 comprising reacting the phenol with the formaldehyde to form a resin, reacting the excess formaldehyde in the resin with urea and subsequently adding sugar to the phenol-formaldehyde-urea resin.

11. A method as in claim 6 or 7 wherein the molar ratio of phenol to formaldehyde is in the range of between 1:3.2 and 1:4.4.

12. A method as in claim 6 or 7 wherein the molar ratio of phenol to formaldehyde is in the range of between 1:3.6 and 1:3.8.

13. A method as in claim 6 or 7 wherein the molar ratio of phenol to formaldehyde is 1:3.7.

14. A method as in claim 6 or 7 wherein the ratio of phenol-formaldehyde to urea is between 60:40 and 45:55 parts by weight.

15. A method as in claim 6 or 7 wherein sugar and urea extenders are added up to a ratio of phenol-formaldehyde resin to total extender of 38:62 parts by weight.

16. A method as in claim 6 or 7 wherein sugar and urea extenders are added up to a ratio of phenol-formaldehyde resin to total extender of 40:60 parts by weight.

17. A method as in claim 6 or 7 wherein the ratio of phenol-formaldehyde resin to total extender is 42:58 parts by weight.

18. A method as in claim 6 or 7 wherein the ratio of phenol-formaldehyde resin to total extender is 45:55 parts by weight.

19. A water-dilutable, thermo-setting, low free phenol-containing resole comprising a condensation product of phenol, formaldehyde, an amide compound selected from the group consisting of urea, dicyandiamide, melamine, and mixtures thereof and a sugar compound selected from the group consisting of mono-and oligosaccharides and water-soluble polysaccharides; the molar ratio of phenol to formaldehyde being between 1:2.8 and 1:4.5, the ratio in parts by weight of phenol-formaldehyde to amide being between 70:30 and 40:60, the amount of amide contained in the resole being at least the maximum amount permissible under given process conditions, and the amount of sugar plus amide extender added being up to a ratio of phenol-formaldehyde to total extender of 35:65 parts by weight.

20. A water-dilutable, thermo-setting, low free phenol-containing resole comprising a condensation product of phenol, formaldehyde, an amide compound selected from the group consisting of urea, dicyandiamide, melamine, and mixtures thereof, and a sugar compound selected from the group consisting of mono- and oligo-saccharides and water-soluble polysaccharides; the molar ratio of phenol to formaldehyde being between 1:2.8 and 1:4.5, the ratio in parts by weight of phenol-formaldehyde to amide being between 70:30 and 40:60, the amount of amide contained in the resole being greater than the maximum amount permissible in the absence of sugar under given process conditions, and the amount of sugar plus amide extender being up to a ratio of phenol-formaldehyde to total extender of 35:65 parts by weight.

21. A water-dilutable, thermo-setting, low phenol-containing resol suitable for use in a binder for binding mineral fibre products, said resol comprising a condensation product of phenol, formaldehyde, urea and a sugar compound selected from the group consisting of mono- and oligosaccharides and water-soluble polysaccharides, the molar ratio of phenol to formaldehyde being between 1:2.8 and 1:4.5, the ratio in parts by weight of phenol-formaldehyde to urea being between 70:30 and 40:60, the amount of urea contained in the resol being at least the maximum amount permissible under given process conditions, and the amount of sugar plus urea extender added being up to a ratio of phenol-formaldehyde to total extender of 35:65 parts by weight.

22. A water-dilutable, thermo-setting, low free phenol-containing resole suitable for use in a binder for binding mineral fibre products, said resole comprising a condensation product of phenol, formaldehyde, urea and a sugar compound selected from the group consisting of mono- and oligosaccharides and water-soluble polysaccharides, the molar ratio of phenol to formaldehyde being between 1:2.8 and 1:4.5, the ratio in parts by weight of phenol-formaldehyde to urea being between 70:30 and 40:60, the amount of urea contained in the resole being greater than the maximum amount permissible in the absence of sugar under given process conditions, and the amount of sugar plus urea extender added being up to a ratio of phenol-formaldehyde to total extender of 35:65 parts by weight.

* * * * *

UNITED STATES PATENT AND TRADEMARK OFFICE
CERTIFICATE OF CORRECTION

PATENT NO. : 4,339,361
DATED : July 13, 1982
INVENTOR(S) : MacPherson et al

It is certified that error appears in the above-identified patent and that said Letters Patent are hereby corrected as shown below:

On the title page:

[56] References Cited, the first reference should read "Deuzeman et al".

Column 4, line 5, delete "coreactants" insert --co-reactants--.
    line 66-67, correct spelling of "knowlegeable".
Column 5, line 54, correct spelling of "corn syrup".
Column 7, line 22, delete "hydrated" insert --dehydrated--.
Column 8, line 17, delete "gram" insert --grams--.

Tables II-VIII, the heading Tensile Strengths only apply to the values reported in Dry and Wet (psi).
Column 13, Table VIII, the heading is separated from the table itself by Table IX.

Signed and Sealed this

Fifteenth Day of November 1983

[SEAL]

Attest:

Attesting Officer

GERALD J. MOSSINGHOFF
Commissioner of Patents and Trademarks